United States Patent [19]

Buma et al.

[11] Patent Number: 4,858,895
[45] Date of Patent: Aug. 22, 1989

[54] VEHICLE FLUID SUSPENSION CIRCUIT WITH EQUALIZED SUPPLY AND DISCHARGE SPEEDS

[75] Inventors: Shuuichi Buma; Nobutaka Ohwa, both of Toyota; Osamu Takeda, Susono; Hajime Kamimae, Toyota, all of Japan

[73] Assignee: Toyota Jidosha Kabushiki Kaisha, Aichi, Japan

[21] Appl. No.: 200,432

[22] Filed: May 31, 1988

[30] Foreign Application Priority Data

Jun. 9, 1987 [JP] Japan ............................. 62-88765[U]
Jun. 9, 1987 [JP] Japan ............................. 62-88766[U]

[51] Int. Cl.$^4$ ...................... B60G 17/00; B60G 11/26
[52] U.S. Cl. ........................ 267/64.16; 267/DIG. 1; 280/714
[58] Field of Search .......... 267/64.16, 64.11, DIG. 1; 280/714, 708, 711, 6 H, DIG. 1, 707, 702

[56] References Cited

U.S. PATENT DOCUMENTS

| | | | |
|---|---|---|---|
| 3,874,692 | 4/1975 | Ono | 280/711 |
| 4,345,661 | 8/1982 | Nismikawa | 280/6 H X |
| 4,462,610 | 7/1984 | Saito et al. | 280/714 X |
| 4,625,994 | 12/1986 | Tanaka et al. | 280/711 X |
| 4,695,074 | 9/1987 | Kobayashi et al. | 280/DIG. 1 |
| 4,718,695 | 1/1988 | Kawagoe | 280/6 R X |

FOREIGN PATENT DOCUMENTS

| | | |
|---|---|---|
| 50-28589 | 9/1975 | Japan . |
| 60-119623 | 8/1985 | Japan . |
| 61-27711 | 2/1986 | Japan . |
| 875969 | 8/1961 | United Kingdom ................ 280/708 |

Primary Examiner—Robert J. Oberleitner
Attorney, Agent, or Firm—Oliff & Berridge

[57] ABSTRACT

A vehicle fluid suspension circuit has an efficient cross-sectional area of the high pressure supply line is smaller than that of the low pressure exhaust line. The fluid supply and discharge speed can be equalized so that the vehicle height increasing speed and the vehicle height decreasing speed are equalized with each other, and the ride comfort is improved. Furthermore, the vehicle suspension circuit has two lines from fluid suspension to low pressure reserve tank are provided during fluid exhaust. A simplified construction can vary a speed of exhausted fluid from fluid suspension. Feeding and exhausting speeds, computation for the valve opening and closing time intervals is improved to be quite simple, and quick control is attained.

8 Claims, 1 Drawing Sheet

VEHICLE FLUID SUSPENSION CIRCUIT WITH EQUALIZED SUPPLY AND DISCHARGE SPEEDS

FIELD OF THE INVENTION

The present invention relates to a fluid circuit of a fluid suspension to be used for a vehicle suspension system using fluid such as air and the like.

BACKGROUND OF THE INVENTION

An air suspension is often used for realizing sophisticated control in connection with an electronic control device because it is comparatively easier to change the suspension characteristics.

Control items by such suspension include adjustment of body height, adjustment of vehicle attitude and can be realized by supplying the adequate amount of air to the air chamber of air suspension of each wheel and by exhausting the air therefrom. However, for the sophisticated suspension control, it is essential to adequately change supply or exhaust rate of air in accordance with respective control purposes. It is preferable for ride comfort to equalize a speed of a vehicle height increase to that of a vehicle height decrease.

A device for controlling the vehicle height has been proposed and developed in order to change the supply rate of air to the air suspension in accordance with these purposes. The reserve tanks are provided in the device to reserve the compressed air in the circuit and two systems of paths, a small diameter pipe and a large diameter pipe, are provided to connect such reserve tanks to the air chambers of suspension unit of respective wheels (Japanese Laid-open Patent Application No. 119623/1985).

Japanese Published Examined Patent Application No. 28589/1975 and Japanese Laid-open Patent Application No. 27711/1986 disclose an air supply system in which both high and low pressure reserve tanks are provided therein, and a compressor compresses air from the low pressure reserve tank and supplies the compressed air to the high reserve tank.

The system of the former prior art and the related various systems have been proposed in order to change a controlled rate of vehicle height during increasing and decreasing of the vehicle height. However, it is rarely taken into account that an increasing speed and a decreasing speed are equalized. Increase and decrease of the vehicle height are executed by supplying and discharging of a fluid to and from the fluid suspension. If the supply speed and the discharge speed are not different from each other and also the increase and decrease speeds of a vehicle height, for example, if air is supplied to either one of right and left suspensions and discharged from the other during turning, discomfort of riding results. In the system of the latter prior art, for example, both high and low pressure reserve tanks are provided, and the high pressure reserve tank supplies the fluid to the fluid suspension, and the discharged fluid from the fluid suspension is reserved into the low pressure reserve tank.

The volume of a fluid chamber should be variable for a vehicle height adjustment or a spring constant adjustment, for this reason, a resilient diaphragm is usually provided. In this diaphragm, it is difficult to maintain the pressure of the fluid chamber of the fluid suspension extremely high in view of pressure proof and durability. Consequently, the pressure of the fluid chamber is usually maintained in a comparatively low pressure. On the other hand, the pressure of the high pressure reserve tank is maintained in a substantially high pressure on account of a volume efficiency of a motor-car and the like. In general, the following equation is obtained:

$$Ph - Pa > Pa - Pl \qquad (1)$$

where Pa represents the fluid chamber's pressure, Ph represents the high pressure reserve tank's pressure, Pl represents the low pressure reserve tank's pressure. In the prior fluid suspension circuit, the above pressure difference is not taken into consideration so that the speed difference between fluid supply and discharge is derived, and the ride comfort becomes worse.

Furthermore, for example, to simply decrease the vehicle height, the air exhausting speed from the respective air suspension of wheels should preferably not be very fast so as not to shock the vehicle. Conversely, during turning, it is preferable that the air exhausting speed is fast so as to stabilize the vehicle attitude, also a driver occasionally may wish to vary the vehicle adjusting speed.

Nevertheless, in the prior art, the fluid in the fluid chamber is exhausted through a predetermined line by opening a predetermined valve so as to decrease the vehicle height or a spring constant. For example, when the air is used as fluid, the exhaust air is directly discharged from the air chamber of the suspension, or is accumulated in the low pressure reserve tank as disclosed in Japan Laid-open Patent Application No. 27711/1986.

However, the above-mentioned method makes a suspension configuration constructed by such as a pipe, a valve quite complicated and the vehicle weight is increased because it is necessary to prepare two lines, respectively, for fluid supply and discharge lines to vary fluid supply and discharge speeds.

SUMMARY OF THE INVENTION

The object of the present invention is to provide a vehicle fluid suspension circuit in which the difference between fluid supply and discharge speeds can be minimized to improve the ride comfort.

The object of the present invention is to provide a vehicle fluid suspension circuit in which the raising and lowering of the vehicle can be promptly attained.

Another object of the present invention is to provide a vehicle fluid suspension circuit in which a simplified construction can vary the speed of the exhausted fluid from the fluid suspension.

The object of the present invention is to provide a vehicle fluid suspension circuit in which using a simple and light construction, the discharge speed of fluid from the fluid chamber of fluid suspension can be freely changed, consequently, the attitude of vehicle can be delicately controlled.

In accordance with the present invention, a vehicle fluid suspension circuit comprises; a fluid suspension of a wheel; fluid supply exhaust system for supplying and exhausting fluid to and from the fluid suspension; a supply line connecting the fluid suspension with the fluid supply exhaust system; an exhaust line connecting the fluid suspension with the fluid supply exhaust system; high pressure reserve tank provided at the supply line for holding a high pressurized fluid therein; a first valve provided at a supply portion of the supply line for supplying the high pressurized fluid from the high pressure reserve tank to the fluid suspension through the supply portion when opened; low pressure reserve tank provided at the exhaust line for holding a low pressurized fluid therein; and a second valve provided at a discharging portion of the exhaust line for allowing a fluid to discharge from the fluid suspension to the low pressure reserve tank through the discharging portion when opened; wherein an effective area of a supply portion of the supply line is smaller than that of a discharging portion of the exhaust line. In accordance with another feature of the present invention, a fluid discharging speed of the fluid suspension is varied in two steps through two lines which introduce the discharged fluid of the fluid suspension into the low pressure reserve tank, one line including the discharging portion of the exhaust line, the other line including the supply line and a portion of the exhaust line, and a bypass line which interconnects the supply line and exhaust line in the supply exhaust system, and an effective area of a supply portion of the supply line is smaller than that of the exhaust line.

DETAILED DESCRIPTION OF THE INVENTION

Figure 1:
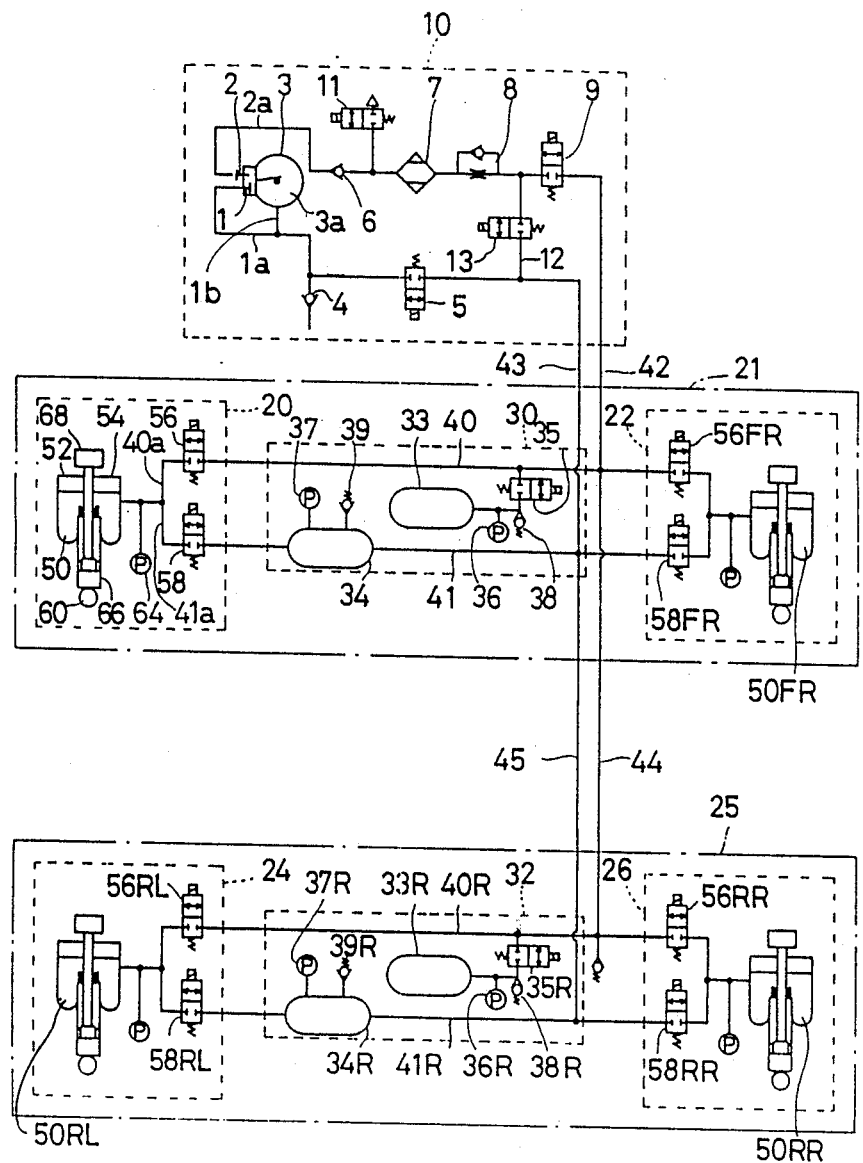
FIG. 1 is a circuit diagram of air suspension system of vehicle as an embodiment of the present invention.

A first embodiment of the present invention is described hereunder referring to the accompanying drawing. Referring to FIG. 1, an air suspension system can roughly be divided into a compressed air supply and exhaust system 10, four suspensions 20, 22, 24 and 26 and reserve systems 30 and 32, which include high and low pressure reserve tanks, respectively. Four suspensions 20, 22, 24, 26 incorporate a front wheels system 21, including right and left front suspensions 20 and 22, and a rear wheels system 25 including right and left rear suspensions 24 and 26. Reservoir systems 30 and 32 are provided to respective systems 21 and 25.

The right and left front suspensions 20 and 22 are connected to a supply pipe 40 and an exhaust pipe 41, respectively. Also, the right and left rear suspensions 24 and 26 are connected to a supply pipe 40R and an exhaust pipe 41R, respectively.

The compressed air supply exhaust system 10 connects to the supply pipe 40 and the exhaust pipe 41 by means of a supply pipe 42 and an exhaust pipe 43, respectively. Also, the front wheel system 21 connects to the rear wheel system 25 by means of a supply pipe 44 and an exhaust pipe 45, respectively.

A pump (CM) 3 having a suction port 1 and an exhaust port 2 is provided in the compressed air supply exhaust system 10. The suction port 1 of the pump 3 is opened to the atmosphere through a check valve 4. A flow control return valve (FRV) 5 is provided in the pipe 43. The pipe 43 connected to the suction port 1 is branched in the course thereof, and communicates with a lower chamber 3a of a piston of the pump 3 in order to alleviate a torque load at the time of starting the pump 3 and during operation thereof.

The exhaust port 2 of pump 3 is connected to the supply pipe 42 through a check valve 6, an air dryer 7, a one-way throttle valve 8 and a flow control main valve (FCV) 9. An exhaust valve (EXV) 11 opened to the atmosphere is provided between the check valve 6 and the air dryer 7 in the air supply side. In the same way, the exhaust pipe 43 is connected to a portion of the supply pipe 42 between the one-way throttle valve 8 and the flow control main valve (FCV) 9 through a bypass line 12 and a flow control bypass valve (FBV) 13.

Since the front and rear reserve systems 30 and 32 have the same structure, explanation will be made only to the reserve system 30 of the front wheel system 21. The reserve system 30 comprises a high pressure reserve tank 33 and a low pressure reserve tank 34. The high pressure reserve tank 33 connects to the supply pipe 40 via a front reserve high pressure valve 35, while the low reserve tank 34 is provided at a path of the exhaust pipe 41. Moreover, respective tanks 33, 34 are, respectively, provided with pressure sensors 36, 37 and relief valves 38, 39. The corresponding valve of the reserve system 32 of rear wheel system 25 are given the letter R after the characters of the valve symbols.

Since the structure and function of the suspension of each wheel are the same, explanation will be made only to the suspension 20 of the left front wheels. The suspension 20 includes an air suspension body 54 having an air chamber 50, a leveling valve (LFLV) 56 and a discharge valve (DFLV) 58 for supplying and discharging compressed air to/from the air chamber 50. The supply pipe 40 and the discharge pipe 41 are joined together between the air suspension body 54 and the valves 56 and 58. The air chamber 50 of air suspension body 54 is provided with a pressure sensor 64. The air suspension body 54 is provided with a shock absorber 66 which shows variable damping forces in addition to the air chamber 50. It is also provided with an actuator 68 for altering damping force. The air suspension body 54 is fixed to a vehicle body (not shown) at an upper part 52 of the air chamber 50 and is also fixed to a suspension arm (not shown) of the front wheel at a lower part 60 of the shock absorber 66. The elements of each suspension corresponding to the right front suspension 22, left rear suspension 24 and right rear suspension 26 are indicated by FR, RL, RR in place of the symbols FL.

In this embodiment, an air pressure $P_{33}$ of the high reserve tanks 33 and 33R is set equal to 15 atm in gauge pressure, which is substantially higher than the ordinary predetermined pressure $P_{50}$ (6.5 atm in gauge pressure) of the air chamber 50, 50FR, 50RL and 50RR so as to increase the volume efficiency and the air feeding speed. On the other hand, the air pressure $P_{34}$ of the low reserve tank 34 and 34R is set nearly equal to the atmospheric pressure (zero atm in gauge pressure). The pressure $P_{33}$ ranges from 10 atm to 15 atm, and the pressure from 0 atm to 5 atm in response to requirement. The sum of the pressures $P_{33}$ and $P_{34}$ is continuously kept nearly constant value, for example $P_{34}$ is set to 1 atm, and then $P_{33}$ to 14 atm.

The air pressure circuit has been described above and an electrical circuit is then described briefly hereunder. Respective pressure sensors are connected to an electronic control device (not shown) and pressure signals of tanks and air chambers are input to the electronic control device. Each wheel is provided with a height sensor (not shown) and body height data at each wheel is also input to the electronic control device. Moreover, each valve is formed by a 2-position electromagnetic valve. It is ordinarily set to the closed condition, on the other hand, it is set to opened position in response to a drive current sent from the electronic control device.

The electronic control device carries out calculation in response to a stored program for adjustment of body height in accordance with the input signals sent from respective pressure sensors, height sensor and other sensors. Also, it calculates the amount of the air to be supplied to the air chamber of each suspension and to be discharged therefrom. The electronic control device supplied the drive current to the related 2-position electromagnetic valve in response to the value thus calculated. It then executes predetermined adjustment of body height, and control of vehicle attitude. In the case of the control of vehicle attitude, a damping force of the shock absorber 66 is also changed.

In operation, the system of the first embodiment is carried out during increase and decrease of the vehicle height is hereunder described. First, for example, when the decrease of the vehicle height from a predetermined level is detected in accordance with the detected signal of a vehicle height sensor provided at respective wheel, in order to increase the vehicle height, the electronic control apparatus supplies the air to the air chambers 50, 50FR, 50RL and 50RR of the air suspensions 54, 54FR, 54RL and 54RR so as to resume the vehicle height. More specifically, the drive currents are applied to the solenoids of the valves 35 and 35R of respective high reserve tank 33 and 33R, and of the leveling valves 56, 56FR, 56RL and 56RR so that the valves are controlled in an opened position. The compressed high pressure air is then supplied from the high reserve tanks 33 and 33R to respective air chamber 50, 50FR, 50RL, 50RR. The energized time intervals of the solenoids are determined in response to the decreased quantity of the detected vehicle height from the predetermined level. At this time, the solenoid valves, other than above-mentioned solenoid valves, are in the closed position.

Next, another operation is carried out, for example, when the increase of the vehicle height from the predetermined level is detected in accordance with the detected signal of a vehicle height sensor. In order to decrease the vehicle height, the electronic control apparatus executes a predetermined routine and discharges the air from the air chambers 50, 50FR, 50RL and 50RR of the air suspensions 54, 54FR, 54RL and 54RR so as to resume the vehicle height. More specifically, the drive currents are applied to the solenoids of the discharge valves 58, 58FR, 58RL and 58RR of respective suspensions 20, 22, 24 and 26 so as to be in an opened position. The air is discharged from the air chamber 50, 50FR, 50RL and 50RR to the front and rear low reserve tanks 34 and 34R. The energized time intervals of the solenoids are determined in response to the increased quantity of the detected vehicle height from the predetermined level. At this time, the solenoid valves other than above-mentioned solenoid valves are in the closed position.

As described above, when air is supplied to the air chambers 50, 50FR, 50RL and 50RR, a first line comprises the high reserve tank 33, the front reserve high pressure valve 35, the supply pipe 40 the leveling valve 56 and a passage 40a which connects the air chamber 50 with the leveling valve 56. On the other hand, when air is discharged from the air chambers 50, 50FR, 50RL and 50RR, a second line from the air chambers to the low reserve tank 34 comprises a passage 41a from the air chamber 50 to the discharge valve 58, and the exhaust pipe 41. The effective cross sectional areas of the first and second lines are computed as follows:

$$Si = \sqrt{1/(1/S^2 35 + 1/S^2 40 + 1/S_2 56 + 1/S^2 40a)} \quad (1)$$

$$So = \sqrt{1/(1/S^2 41a + 1/S^2 58 + 1/S^2 41)} \quad (2)$$

where Si:
the effective cross-sectional area of the first line during air supply
So: the effective cross-sectional area of the second line during air exhaust
Sxx: the effective cross-sectional area of respective element indicated by numeral xx.

The high reserve tank 33 is usually positioned adjacent to the low reserve 34 so that the effective cross-sectional area $S_{40}$ of the supply pipe 40 is determined equal to $S_{41}$, similarly, $S_{40a}$ is equal to $S_{41a}$, and $S_{56}$ is equal to $S_{58}$. Si is smaller than So because the value of denominator, having $1/S^2 35$, of Si is greater than that of So.

The pressure difference between the air pressure $P_{33}$ of the high reserve tank 33 and the air pressure $P_{50}$ of the air chamber 50 is greater than that between the air pressure $P_{50}$ and the air pressure $P_{34}$.

Therefore, the air supply speed is equalized to the air discharge speed because the above pressure difference is taken into account by the effective cross-sectional area difference. Increase and decrease rates of the vehicle height are thus equalized with each other so that the height control for the vehicle is naturally carried out. The control programs can be simplified because the above speed difference needs not to be taken into consideration during other controls.

In the case that the valve 35 for high reserve can not compensate for the pressure difference for design reasons, throttling means may be provided in the supply pipe 40.

In accordance with advantage of the embodiment the high reserve valve 35 is provided at the high reserve tank 33 so as to open to supply the air from the high reserve tank 33 to the air chamber 50 during air feeding. Alternatively, it can close so as to directly supply the air chamber 50 from the compressor 3 by closing the high reserve valve 35, thereby, the air feeding speed can be varied in two steps.

Furthermore, the low reserve tank 34 directly receives the air exhausted from the air chamber 50 during air exhaust. Alternatively, it can receive the air through a line comprising the air chamber 50, the supply pipes 40 and 42, the bypass pipe 12, the exhaust pipes 43 and 41 by closing the valve 35 and opening the bypass valve 13. In this case the air discharging speed can be varied in two steps.

A second embodiment of the present invention is hereinafter described. A construction of the second embodiment is similar to that of the first embodiment so that description of a common part thereof is omitted.

In accordance with the second embodiment, a diameter of the bypass pipe 12 is smaller than those of the supply pipe 42 and exhaust pipe 43, and an effective cross-sectional area of the bypass valve 13 is also smaller than those of the other valves.

Operations of the second embodiment are carried out during quick and slow decreasing of the vehicle height. First, during quick decreasing of the vehicle height, for example, when the quick increase of the vehicle height at the left side front and rear wheels is detected in accordance with the detected signal of a vehicle height sensor provided at respective wheels. The electronic control apparatus determines that the vehicle turns left and starts to quickly decrease the left side vehicle height so as to stabilize the vehicle attitude. More specifically, the drive currents are supplied to solenoids of the discharge valves 58, 58RL of the left side front and rear suspensions 20, 24 so that the valves are controlled in an opened position. The air is exhausted from the air chambers 50 and 50RL of left side wheels to the low reserve tanks 34 and 34R. The energized time interval of the solenoid is determined in response to degree of increase of the left side vehicle height. At this time, solenoid valves other than above-mentioned valves are in the closed position.

Next, another operation is carried out during slowly decreasing the vehicle height, for example, when the increase of the vehicle height is not temporarily but continuously detected. The electronic control apparatus executes a predetermined routine so as to slowly resume the vehicle height by means of valve operations. It can be determined whether or not the vehicle rises temporarily, by removing the high frequency component of the vehicle height sensor signal. The leveling valves 56, 56FR, 56RL and 56RR of the suspensions 20, 22, 24 and 26, the flow control main valve 9 of the compressed air supply exhaust system 10, and the bypass valve 13 are opened. Other valves are all closed. The air from the air chambers 50, 50FR, 50RL and 50RR is discharged to the low reserve tanks 34 and 34R through a line comprising the leveling valves 56, 56FR, 56RL and 56RR, the supply pipes 40, 42, 40R and 44, the flow control main valve 9, the bypass pipe 12, the bypass valve 13, the exhaust pipe 43, 41, 45 and 41R. This latter exhaust line including valves 9, 13, etc., is longer than the former line including the discharge valve 58. The latter is so long as to have the bypass pipe 12 and the bypass valve 13 which are smaller in diameter, existing other many valves therein. Therefore, a flow resistance of the latter line is greater than that of the former line, and the air exhaust speed of the former line including the valve 58 is faster than that of the latter line. The energized time interval is varied in response to the degree of the vehicle height increase.

Another construction to vary the effective cross-sectional area may be adapted in place that the diameters of bypass pipe 12 and the bypass valve 13 are narrowed and that the former and latter lines are different in the length to vary the effective cross-sectional area. For example, an internal diameter of the supply pipes 40, 40R, 42 and 44 may become smaller than the exhaust pipes 41, 41R, 43 and 45. Alternatively, restriction may be provided in the bypass pipe 12.

As described above, the present invention is not limited to the second embodiment in which the height control is executed when the vehicle turns and when the vehicle height is totally increased. Whenever the air exhaust speed from the air chamber is varied the present invention can be adapted in accordance with any object.

In the second embodiment, in addition to the natural exhausting line, another exhausting line is constructed by elements such that the bypass valve 12 is provided between the supply pipe 42 and the exhaust pipe 43 and the supply pipes 40, 40R, 42 and 44. These pipes are used for exhaustion as well as for supply in itself. Therefore, the air exhaust speed can be varied in two steps, and freedom of control for vehicle height and spring constant is improved.

Furthermore, the leveling valves 56, 56FR, 56RL and 56RR, the flow control main valve 9, and the exhaust valve 11 are opened so that the air from the air chambers 50, 50FR, 50RL and 50RR may be directly exhausted into the atmosphere. In this case, the air exhaust speed becomes much lowered than the above two lines by providing a one directional restrictor 8.

Another effect produced by the bypass pipe 12 and the bypass valve 13 are hereinafter described. The compressed air is either supplied from the compressor 3 to the high reserve tanks 33 and 33R, or supplied directly from the compressor 3 to the air chambers 50, 50FR, 50RL and 50RR, and passing through the air dryer. Moisture from working fluid is removed so as to prevent corrosion in the suspension circuit and volumetric changes of the air chamber due to moisture phase change.

In general, the air dryer 7 is saturated with moisture after its short time usage, resulting in deteriorating its ability. For this purpose, the bypass valve 13 is opened so as to pass the air of the low reserve tanks 34 and 34R through the dryer 7 via the exhaust pipes 41, 43 41R and 45, and the bypass pipe 12. The dryer 7 releases moisture to the air, and thus the moistured air is exhausted to the atmosphere thereby restoring the drying ability and enabling an extended time period usage.

Obviously many modifications and variations of the present invention are possible in the light of the above teachings. It is therefore to be understood that within the scope of the appended claims in the invention may be practiced otherwise than as specifically described.

What is claimed is:

1. A vehicle fluid suspension circuit comprising:
   a fluid suspension of a vehicle;
   fluid supply/exhaust means for supplying and exhausting fluid to and from said fluid suspension;
   a supply line connecting said fluid suspension at a first position with said fluid supply/exhaust means;
   an exhaust line connecting said fluid suspension at a second position with said fluid supply/exhaust means;
   high pressure reserve means provided at said supply line for maintaining a high pressurized fluid therein;
   a first valve provided at a supply portion of said supply line for supplying said high pressurized fluid from said high pressure reserve means to said fluid suspension through said supply portion when said first valve is opened;
   low pressure reserve means provided at said exhaust line for maintaining a low pressurized fluid therein; and
   a second valve provided at a discharging portion of said exhaust line for allowing fluid to discharge from said fluid suspension to said low pressure reserve means through said discharging portion when said first valve is opened;
   wherein an effective area of a supply portion of said supply line is smaller than that of a discharging portion of said exhaust line so that a fluid supply speed is equalized to a fluid discharge speed.

2. A vehicle fluid suspension circuit according to claim 1 wherein said supply portion includes a diverged portion which is provided with a third valve which opens to allow said high pressurized fluid supplied from said high pressure reserve. means to said fluid suspension.

3. A vehicle fluid suspension circuit according to claim 1 wherein said fluid supply/exhaust means includes a compressor, a flow control valve provided in said supply line for supplying fluid from said compressor to said fluid suspension, a flow control bypass valve for feeding fluid from said supply line to said exhaust line and a flow control return valve provided in said exhaust line for exhausting fluid from said low pressure reserve means to said compressor.

4. A vehicle fluid suspension circuit according to claim 3 wherein said compressor supplies compressed fluid to said fluid suspension via said supply line instead of supplying the fluid through a third valve and said high pressure reserve means so as to vary a fluid supply speed of said fluid suspension in two steps, and said compressor receives the exhausted fluid from said low reserve means via said exhaust line.

5. A vehicle fluid suspension circuit according to claim 1 wherein a fluid discharging speed of said fluid suspension is varied in two steps through two lines, which introduce the discharged fluid of said fluid suspension into said low pressure reserve means, one line including said discharging portion of said exhaust line, the other line including said supply line and a portion of said exhaust line, and a bypass line which interconnects said supply line and exhaust line in said supply/exhaust means.

6. A vehicle fluid suspension circuit according to claim 1 wherein said supply portion and said discharge portion are joined together between said fluid suspension and said first and second valves.

7. A vehicle fluid suspension circuit comprising:
a fluid suspension of a vehicle;
fluid supply/exhaust means for supplying and exhausting fluid to and from said fluid suspension;
a supply line connecting said fluid suspension with said fluid supply/exhaust means;
an exhaust line connecting said fluid suspension with said fluid supply/exhaust means;
a first valve provided at said supply line for supplying said high pressurized fluid from said supply/exhaust means to said fluid suspension through said supply line when opened;
low pressure reserve means provided at said exhaust line for maintaining a low pressurized fluid therein; and
a second valve provided at a discharging portion of said exhaust line for allowing fluid to discharge from said fluid suspension to said low pressure reserve means through said discharging portion when opened;
wherein a fluid discharging speed of said fluid suspension is varied in two steps through two lines which introduce the discharged fluid of said fluid suspension into said low pressure reserve means, one line being said discharging portion of said exhaust line, the other line including said supply line and a portion of said exhaust line and a bypass line which inter-connects said supply line and exhaust line in said supply/exhaust means, and an effective area of said supply line is smaller than that of said exhaust line so that a fluid supply speed is equalized to a fluid discharge speed.

8. A vehicle fluid suspension circuit comprising:
a fluid suspension of a vehicle;
fluid supply/exhaust means for supplying and exhausting fluid to and from said fluid suspension;
a supply line connecting said fluid suspension with said fluid supply/exhaust means;
an exhaust line connecting said fluid suspension with said fluid supply/exhaust means;
high pressure reserve means provided at said supply line for maintaining a high pressurized fluid therein;
a first valve provided at a supply portion of said supply line for supplying said high pressurized fluid from said high pressure reserve means to said fluid suspension through said supply portion when said first valve is opened;
low pressure reserve means provided at said exhaust line for maintaining a low pressurized fluid therein; and
a second valve provided at a discharging portion of said exhaust line for allowing fluid to discharge from said fluid suspension to said low pressure reserve means through said discharge portion when said first valve is opened;
a flow control valve in said supply line upstream of said fluid suspension;
a flow control return valve upstream of said fluid suspension in said exhaust line;
a bypass line connecting said supply line at a position upstream from said flow control valve to said exhaust line at a position downstream from said flow control return valve, said bypass line including a bypass valve;
wherein an effective area of a supply portion of said supply line is smaller than that of a discharging portion of said exhaust line.

* * * * *